(No Model.)

J. T. RICHARDS.
LUBRICATING AXLE.

No. 531,808. Patented Jan. 1, 1895.

Witnesses
E. E. Nottingham
G. F. Downing.

Inventor
J. T. Richards
By H. A. Seymour
Attorney

THE NORRIS PETERS CO., PHOTO-LITHO., WASHINGTON, D. C.

UNITED STATES PATENT OFFICE.

JOHN T. RICHARDS, OF GARDINER, MAINE.

LUBRICATING-AXLE.

SPECIFICATION forming part of Letters Patent No. 531,808, dated January 1, 1895.

Application filed July 25, 1894. Serial No. 518,576. (No model.)

*To all whom it may concern:*

Be it known that I, JOHN T. RICHARDS, of Gardiner, in the county of Kennebec, State of Maine, have invented certain new and useful Improvements in Lubricating-Axles; and I do hereby declare the following to be a full, clear, and exact description of the invention, such as will enable others skilled in the art to which it appertains to make and use the same.

My invention relates to an improvement in axle journals, the object being to provide a substantial and inexpensive axle which will hold a considerable supply of oil, maintain a constant and uniform distribution and more particularly one which will only require lubricating at long intervals.

A further object is to provide an axle which will prevent the escape and waste of oil during both the running and standing of the vehicle.

With these objects in view my invention consists in certain novel features of construction and combinations of parts, which will be hereinafter described, and pointed out in the claims.

Figure 1:
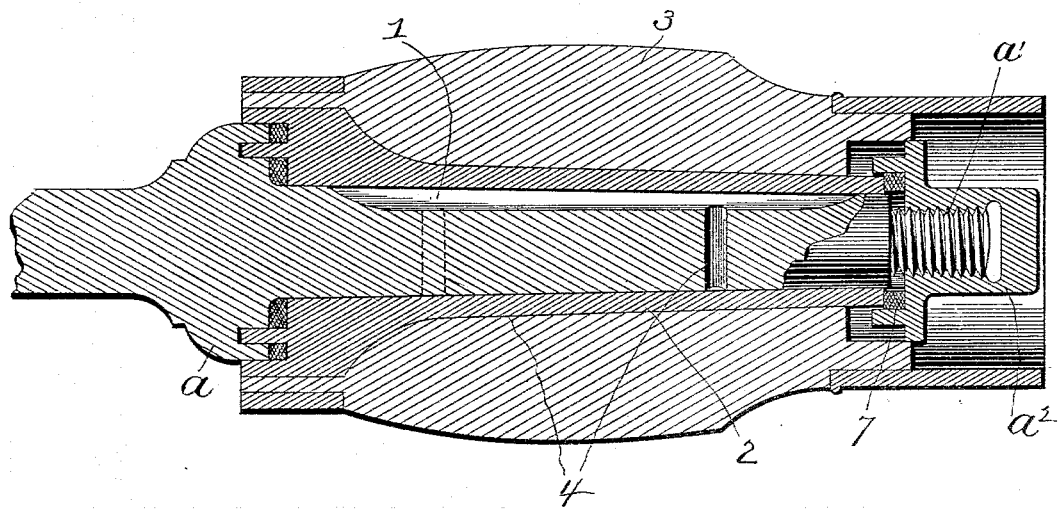
Figure 2:
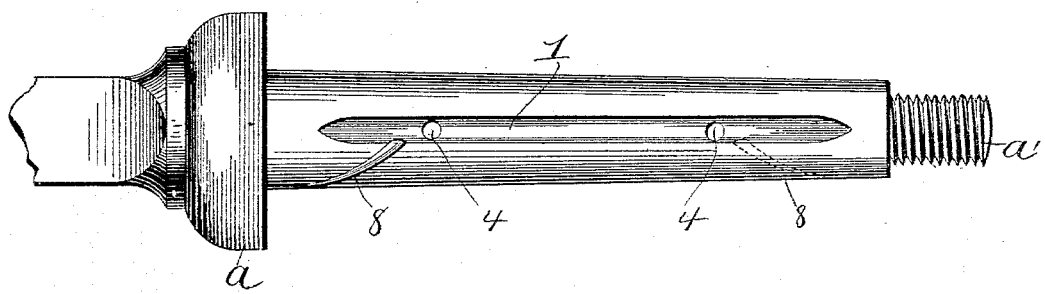

In the accompanying drawings, Figure 1 is a view in elevation of my preferred form of axle, showing a hub thereon, in section and a portion of the journal broken away. Fig. 2 is a plan view of a modification in which spiral lateral grooves are shown leading into the main longitudinal groove for collecting any superfluous oil which may accumulate at the ends of the journal and returning it to the main groove.

A represents an axle journal adapted to enter and be supported in a wheel hub in the usual manner. The journal is preferably provided with the customary collar or dust guard at its inner end as at $a$ and is screw threaded as at $a'$ at the outer end to receive the nut or burr $a^2$. A longitudinal groove 1 of considerable depth is formed in the top of the journal and serves as a reservoir for oil. This groove extends nearly the length of the journal, decreasing in depth gradually and terminating at the ends a short distance within the ends of the journal so that the journal is left smooth and unbroken between the ends of the groove and the ends of the journal, to the end that the hub box 2 in the hub 3, which covers the groove 1 throughout the entire length of the latter, closes also the ends of the groove, acting as a valve at these points to prevent the escape of oil at both ends of the hub. One or more holes 4 extend from the bottom of the main groove 1 through the journal to the surface of the journal, preferably to some point directly opposite the groove, the object of this hole or holes being to furnish an outlet for the lubricating material, as it cannot escape from the groove 1 directly except possibly when the latter is first filled, or filled to overflowing. As the hub box 2 fits the axle-journal it acts as a valve for the lower end of the hole or holes 4 thus preventing any excessive outpouring of the oil therefrom, while at the same time as the wheel turns oil is constantly and uniformly supplied to the hub-box, enough at all times to keep it well lubricated. When the vehicle is stationary the hole or holes are of course closed by the hub-box. In this manner the oil is used gradually and wheels run for a long time constructed in this manner.

The nut on the end of the journal has a washer 7 therein which fits on the end of the axle journal outside of the end of the groove 1. This washer naturally acts as a stopper to prevent the escape of any oil which might possibly find its way out at the outer end of the journal. At most this would necessarily be slight, as the shape of the journal would tend to cause the flow of any excess of oil the other way due to centrifugal force. There is also a washer at collar on inner end of axle arm beyond groove to stop escape of oil.

In the modification spiral or lateral grooves 8, 8, are shown leading preferably from points near the ends of the journal and about a quarter way around the journal, to the rear. These grooves 8, 8, gradually increase in depth from nothing to the point where they enter the main groove 1 and they are for the purpose of collecting the oil at the ends of the journal and returning the excess to the main groove 1. When these grooves 8, 8, are used leakage of oil at the ends is absolutely prevented.

It is evident that slight changes might be resorted to in the form and arrangement of the several parts described without departing from the spirit and scope of my invention and hence I do not wish to limit myself to the exact construction herein set forth, but, Having fully described my invention, what I claim as new, and desire to secure by Letters Patent, is—

1. An axle journal having a collar on one end and screw threaded on the other end, said journal having a longitudinal groove formed therein, said groove terminating at both ends a sufficient distance from the collar and screw threaded portion of the journal to leave an unbroken surface or bearing between the groove and the collar and screw thread, and the journal provided with a hole leading from the groove through the journal to the surface of the journal, substantially as set forth.

2. An axle journal having a longitudinal groove formed therein extending nearly the length of the journal, a hole leading from the groove to the surface of the journal, and a short groove extending from the longitudinal groove in a spiral direction toward one end of the journal, said short groove adapted to collect any oil which works toward that end of the journal and conduct it back into the longitudinal groove, substantially as set forth.

3. An axle journal having a longitudinal groove formed in its upper surface, short spiral grooves extending from the longitudinal groove toward the ends of the axle journal, and a hole leading from one end of the longitudinal groove through the axle journal to the opposite surface, substantially as set forth.

4. An axle journal having a longitudinal groove formed in its upper surface, holes leading from the ends of this groove through the journal to the opposite surface of the journal, and short spiral grooves leading from the longitudinal groove to the ends of the axle journal, substantially as set forth.

In testimony whereof I have signed this specification in the presence of two subscribing witnesses.

JOHN T. RICHARDS.

Witnesses:
A. E. HARMON,
GEO. W. HESELTON.